United States Patent
Wilcox et al.

[11] Patent Number: 5,855,375
[45] Date of Patent: Jan. 5, 1999

[54] SEAL FOR STEERING ASSIST FLUID MOTOR

[75] Inventors: Patrick Michael Wilcox, Flint; David Michael Kubiak, Saginaw, both of Mich.

[73] Assignee: General Motors Corporation, Detroit, Mich.

[21] Appl. No.: 854,458

[22] Filed: May 12, 1997

[51] Int. Cl.[6] .................................................. F16J 15/32
[52] U.S. Cl. .......................................... 277/551; 277/572
[58] Field of Search ..................... 92/166, 168; 277/584, 277/551, 572

[56] References Cited

U.S. PATENT DOCUMENTS

| | | | |
|---|---|---|---|
| 3,817,155 | 6/1974 | Walter | 92/167 |
| 4,063,490 | 12/1977 | Duffy | 91/467 |
| 4,280,741 | 7/1981 | Stoll | 92/168 X |
| 4,301,691 | 11/1981 | Walter | 74/422 |
| 4,307,622 | 12/1981 | Walter | 74/422 |
| 4,351,228 | 9/1982 | Schultz et al. | 92/128 |
| 4,508,020 | 4/1985 | Szcupak | 92/168 X |
| 5,181,581 | 1/1993 | Engler | 92/168 X |
| 5,271,476 | 12/1993 | Minamibata | 180/148 |
| 5,326,112 | 7/1994 | Paykin | 277/584 X |
| 5,332,234 | 7/1994 | Forch et al. | 277/584 X |

*Primary Examiner*—Anthony Knight
*Assistant Examiner*—Gary Grafel
*Attorney, Agent, or Firm*—Saul Schwartz; Dean L. Ellis

[57] ABSTRACT

An outboard seal between a rack bar of a rack and pinion steering gear and a fluid motor cylinder tube around the rack bar. The outboard seal includes an annular bulkhead in an outboard end of the cylinder tube around the rack bar, a metal retaining ring preventing dislodgment of the bulkhead from the cylinder tube by fluid pressure in the cylinder tube, and a seal ring adjacent an end wall of the bulkhead having an outer surface resiliently pressing against the cylinder tube and an inner lip biased against the rack bar by garter spring. A coupling between the seal ring and the bulkhead consists of an annular groove in a cylindrical shoulder on the bulkhead and a flexible lip on the seal ring stretched over the cylindrical shoulder and seated loosely in the annular groove. The flexible lip and the annular groove cooperate in uniting the bulkhead and the seal ring for unitary handling and transport outside of the cylinder tube and in uncoupling the seal ring from the bulkhead inside the cylinder tube to isolate the seal ring from relative movement between the bulkhead and the cylinder tube which would otherwise cause the seal ring to wear.

2 Claims, 3 Drawing Sheets

SEAL FOR STEERING ASSIST FLUID MOTOR

TECHNICAL FIELD

This invention relates to rack and pinion steering gears for motor vehicles.

BACKGROUND OF THE INVENTION

U.S. Pat. No. 4,351,228, issued Sep. 28, 1982 and assigned to the assignee of this invention, describes a motor vehicle rack and pinion steering gear including a steering gear housing, a rack bar supported on the steering gear housing for back and forth linear translation, and a steering assist fluid motor consisting of a cylinder tube around the rack bar defining an extension of the steering gear housing, a piston on the rack bar sealing against the cylinder tube, and inboard and outboard seals between the cylinder tube and the rack bar on opposite sides of the piston. The inboard seal consists of a metal-reinforced elastomeric ring having an outer cylindrical surface interference fitted in the cylinder tube adjacent the steering gear housing and an inner lip biased against the rack bar by a garter spring and reinforced by a polymeric annular insert against being squeezed between the rack bar and the steering gear housing. The outboard seal consists of a metal annular bulkhead in an outboard end of the cylinder tube defining a bearing for the rack bar, a static O-ring in a groove in the bulkhead facing the cylinder tube, and a seal ring on the bulkhead having an annular lip engaging the rack bar. An outboard seal according to this invention is an improvement relative to the outboard seal of the rack and pinion steering gear described in the aforesaid U.S. Pat. No. 4,351,228.

SUMMARY OF THE INVENTION

This invention is a new and improved outboard seal between a rack bar of a motor vehicle rack and pinion steering gear and a fluid motor cylinder tube around the rack bar. The outboard seal includes a metal annular bulkhead in an outboard end of the cylinder tube around the rack bar, a metal retaining ring in a pair of facing annular grooves in the bulkhead and in the cylinder tube preventing dislodgment of the bulkhead from the cylinder tube by fluid pressure in the cylinder tube, and a seal ring adjacent an end wall of the bulkhead having an outer surface resiliently pressing against the cylinder tube and an inner lip biased against the rack bar by a garter spring. A coupling between the seal ring and the bulkhead consists of an annular groove in a cylindrical shoulder on the bulkhead and a flexible lip on the seal ring stretched over the cylindrical shoulder and seated loosely in the annular groove. The flexible lip and the annular groove cooperate in uniting the bulkhead and the seal ring for transport as a unit outside of the cylinder tube. With the bulkhead and the seal ring both fitted tightly in the cylinder tube, clearance between the flexible lip and the annular groove of the coupling and/or the flexibility of the lip uncouples the seal ring from the bulkhead to isolate the seal ring from relative movement between the bulkhead and the cylinder tube which would otherwise cause the seal ring to wear.

DESCRIPTION OF THE PREFERRED EMBODIMENT

Figure 1:
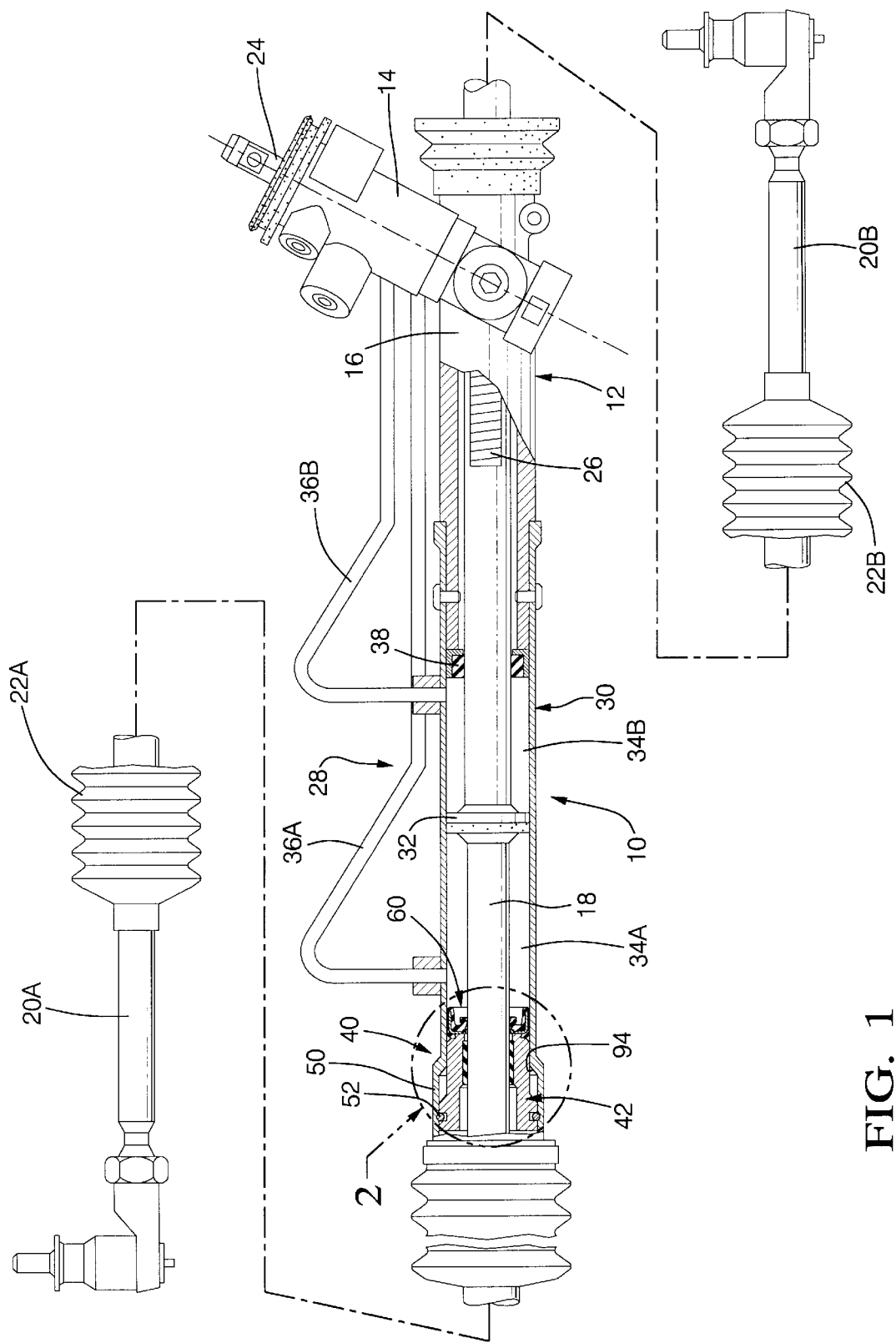
FIG. 1 is a partially broken-away view of a rack and pinion steering gear for a motor vehicle having an outboard seal according to this invention.

Referring to FIG. 1, a power assisted rack and pinion steering gear 10 for a motor vehicle, not shown, includes a steering gear housing 12 consisting of a cylindrical valve housing 14 and a tubular rack housing 16. A rack bar 18 of the steering gear 10 is supported in the rack housing 16 for back and forth linear translation in the length direction of the rack bar. A pair of tie rods 20A, 20B coupled to opposite ends of the rack bar within a pair of flexible boots 22A, 22B link the rack bar to dirigible wheels, not shown, of the motor vehicle such that back and forth linear translation of the rack bar steers the motor vehicle in the usual fashion.

An input shaft 24 is rotatably supported on the valve housing 14 and connected to a manual steering wheel, not shown, of the motor vehicle. A pinion gear, not shown, meshes with a rack gear 26 on the rack bar 18 and is connected to the input shaft 24 as described in U.S. Pat. No. 4,454,801, issued Jun. 19, 1984 and assigned to the assignee of this invention, such that rotation of the input shaft effects concurrent back and forth linear translation of the rack bar.

A fluid motor 28 of the rack and pinion steering gear 10 includes a cylinder tube 30 around the rack bar 18 defining an extension of the rack housing 16 and a piston 32 on the rack bar slidably sealed against the cylinder tube and dividing the latter into a pair of working chambers 34A, 34B on opposite sides of the piston. The working chambers 34A, 34B are connected to a valve, not shown, in the valve housing 14 through a pair of fluid conduits 36A, 36B, respectively. As described in the aforesaid U.S. Pat. No. 4,454,801, the valve distributes fluid from a pump, not shown, to either one of the working chambers 34A, 34B in accordance with the direction of rotation of the input shaft 24 while concurrently connecting the other of working chambers to a reservoir, not shown. A schematically-represented inboard seal 38 between the rack bar 18 and the cylinder tube 30 seals the end of the working chamber 34B opposite the piston 32. An outboard seal 40 according to this invention between the rack bar 18 and the cylinder tube 30 seals the end of the working chamber 34A opposite the piston 32.

The outboard seal 40 includes a metal annular bulkhead 42 having a pair of cylindrical outer wall segments 44A, 44B, a pair of annular ends 46A, 46B, and an inner cylindrical wall 48. The outer wall segment 44B of the bulkhead is closely received in the cylinder tube 30. The outer wall segment 44A is closely received in an expanded outboard end 50 of the cylinder tube. A retaining ring 52 radially overlapping an annular groove 54 in the outer wall segment 44A of the bulkhead and a facing annular groove 56 in the expanded outboard end 50 of the cylinder tube prevents dislodgment of the bulkhead 42 from the cylinder tube 30 by fluid pressure in the working chamber 34A of the fluid motor. The rack bar is slidably journaled on the bulkhead 42 by a sleeve bearing 58 between the inner cylindrical wall 48 of the bulkhead and the rack bar 18.

The outboard seal 40 further includes a seal ring 60 in the working chamber 34A adjacent the annular end 46B of the bulkhead 42. The seal ring 60 consists of an annular metal reinforcement 62, an elastomeric body 64 molded around the reinforcement, and an annular polymeric insert 66. The reinforcement 62 has a cylindrical segment 68 and an annular segment 70 in a plane perpendicular to the cylindrical segment. The elastomeric body 64 has a cylindrical outer surface 72 and a flexible annular inner lip 74 each concentric with the cylindrical segment 68 of the reinforcement. The cylindrical outer surface 72 is interrupted by a plurality of annular bosses 76.

Figure 2:
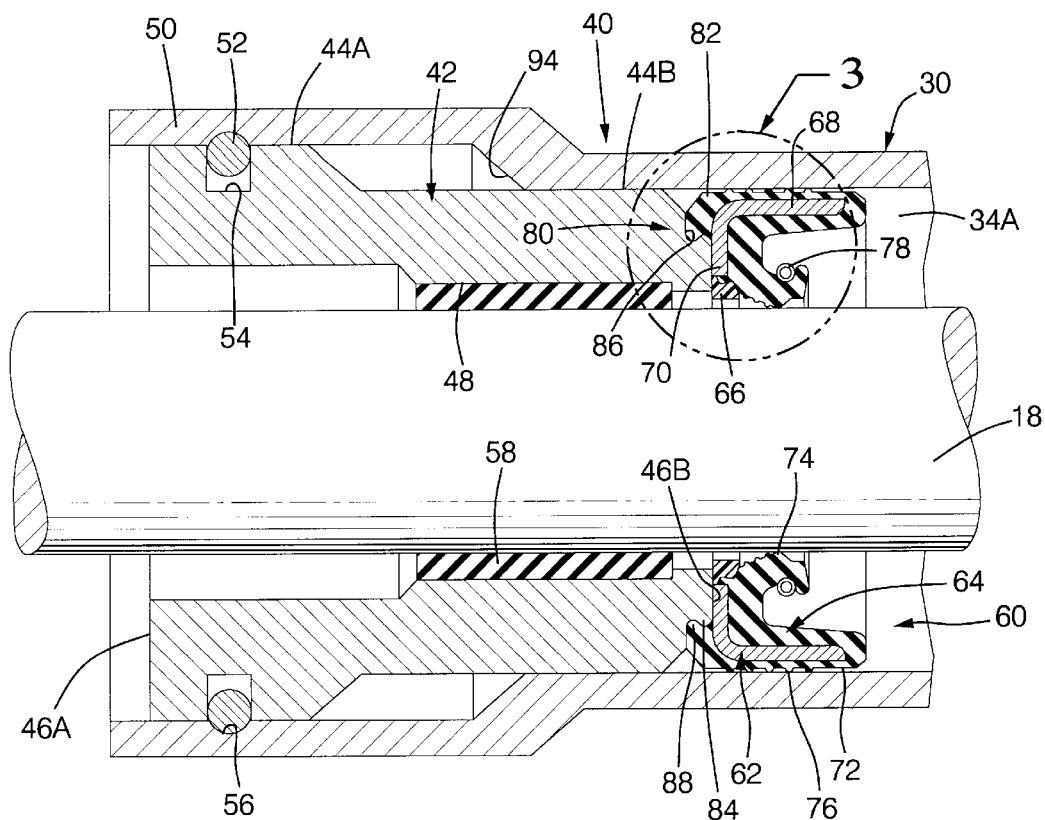
FIG. 2 is an enlarged view of the portion of FIG. 1 identified by the reference circle 2 in FIG. 1.
Figure 3:
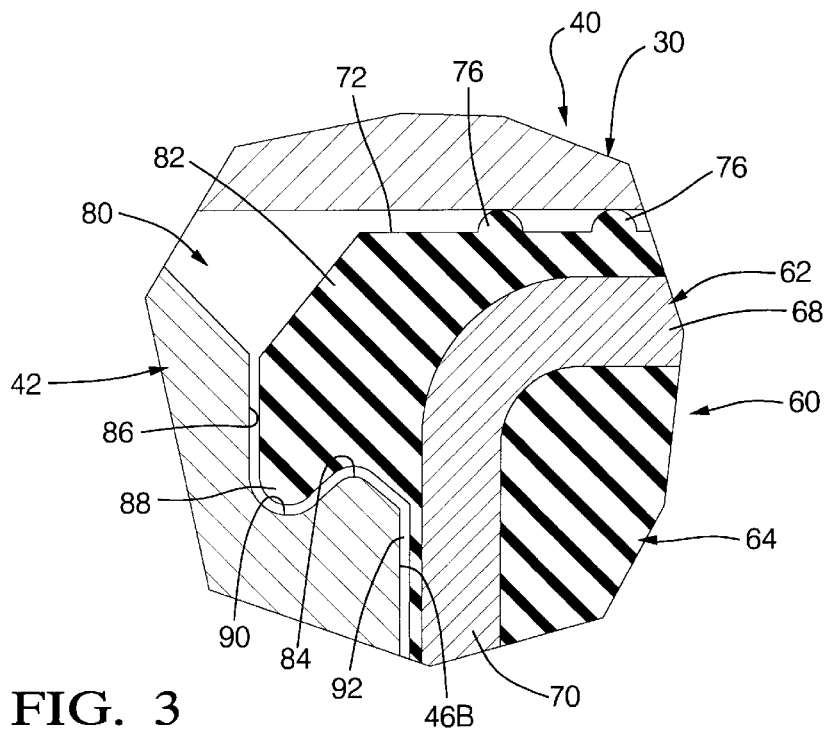
FIG. 3 is an enlarged view of the portion of FIG. 2 identified by the reference circle 3 in FIG. 2.

The cylindrical outer surface 72 and the annular bosses 76, illustrated in an uncompressed condition in FIGS. 2–3 for clarity, are, in fact, interference fitted in the cylinder tube 30 and compressed between the cylinder tube and the cylindrical segment 68 of the reinforcement 62 to define a fluid-tight seal between the seal ring 60 and the cylinder tube. The inner lip 74 is self-compressed against the rack bar 18 and supplementally biased radially inward against the rack bar by a garter spring 78 around the inner lip to define a fluid-tight seal between the seal ring 60 and the rack bar 18. The polymeric insert 66 is resiliently gripped by the elastomeric body 64 inside of the annular segment 70 of the reinforcement 62 for retention of the insert and cooperates with the annular end 46B of the bulkhead 42 in reinforcing the inner lip 74 against fluid pressure in the working chamber 34A which otherwise could squeeze the inner lip between the bulkhead and the rack bar.

Figure 4:
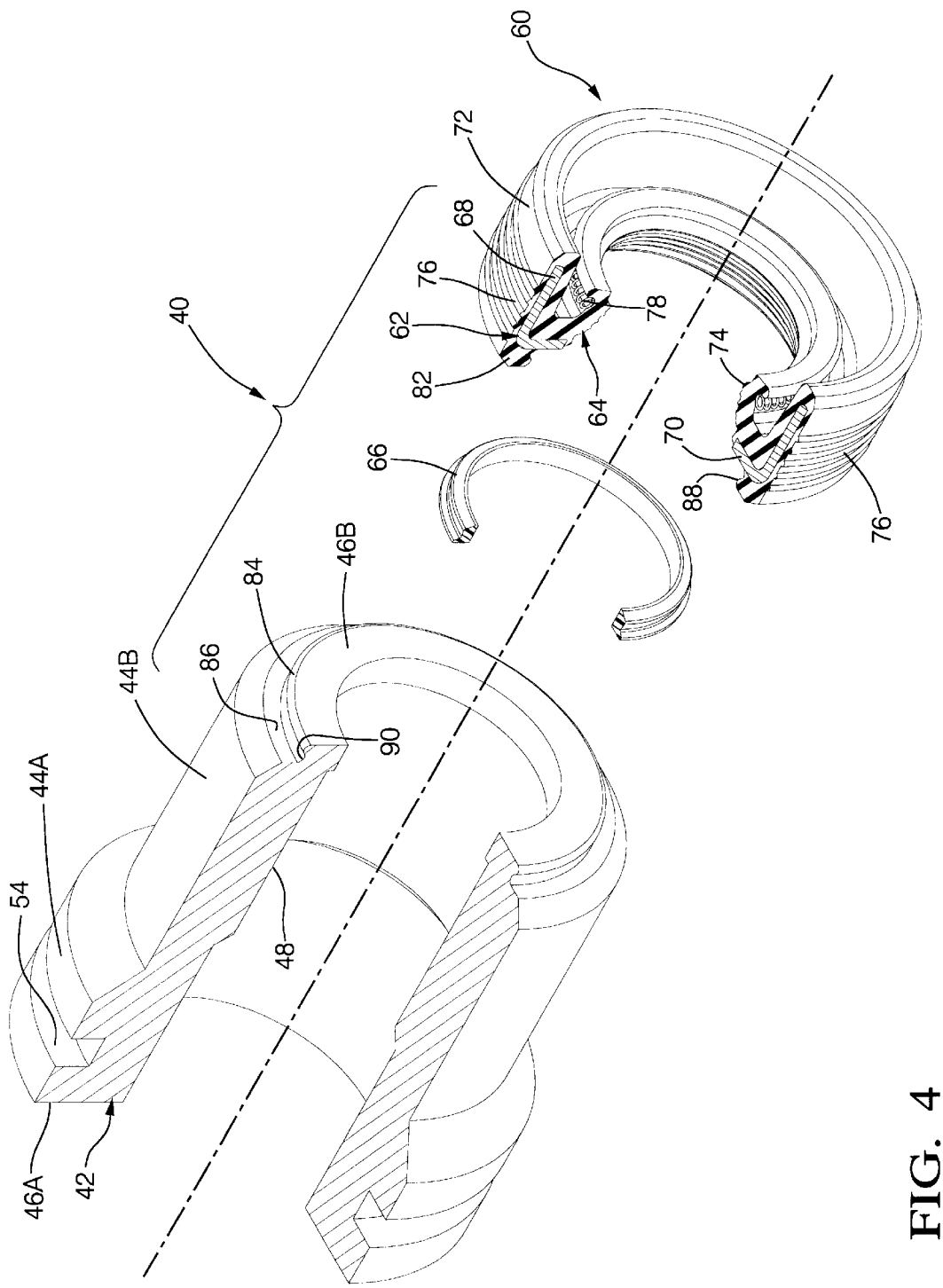
FIG. 4 is a broken-away, exploded perspective view of the outboard seal according to this invention.

As seen best in FIGS. 2–4, a coupling 80 between the bulkhead 42 and the seal ring 60 includes an annular lobe 82 on the molded elastomeric body 64 of the seal ring radially outboard of and longitudinally overlapping a cylindrical shoulder 84 on the bulkhead 42 between the end wall 46B thereof and an annular shoulder 86 on the bulkhead in a plane perpendicular to the cylindrical shoulder 84. An inward facing flexible lip 88 integral with the lobe 82 seats in an outward facing annular groove 90 in the cylindrical shoulder 84 on the bulkhead with a predetermined dimensional clearance 92, illustrated in exaggerated fashion in FIG. 3 for clarity, between the seal ring 60 and the bulkhead 42.

After the seal ring 60 and the bulkhead 42 complete their separate manufacture, they are coupled together by the coupling 80 by stretching the flexible lip 88 on the lobe 82 over the cylindrical shoulder 84 on the bulkhead until the flexible lip seats in the annular groove 90. The clearance 92 between the seal ring and the bulkhead permits relative rotation and relative radial and longitudinal translation between the seal ring and the bulkhead so that the couple between the bulkhead 42 and the seal ring 60 is a relatively loose couple. Being thus coupled together, the bulkhead 42 and the seal ring 60 are handled and transported as a unit, which reduces the expense of such handling and transport.

After the rack bar 18 is installed in the cylinder tube 30, the outboard seal 40 is installed by sliding the coupled-together bulkhead 42 and seal ring 60 over the rack bar into the expanded outboard end 50 of the cylinder tube. The annular end 46B of the bulkhead 42 engages the annular segment 70 of the reinforcement 62 of the seal ring and induces linear translation of the seal ring ahead of the bulkhead into the cylinder tube in response to a force on the annular end 46A of the bulkhead. A frustoconical shoulder 94 on the cylinder tube at the end of the expanded outboard end 50 thereof radially compresses the elastomeric body 64 of the seal ring to interference fit the cylindrical outer surface 72 thereof in the cylinder tube. The seal ring 60 achieves an installed position, FIGS. 2–3, when the facing annular grooves 54, 56 in the bulkhead and in the cylinder tube register. Forces on the seal ring 60 induced by fluid pressure in the working chamber 34A urging dislodgment of the seal ring from the cylinder tube are reacted to the cylinder tube through the bulkhead 42 and the retaining ring 52.

With the rack and pinion steering gear 10 mounted on a motor vehicle by attachment at the cylinder tube 30 and at the rack housing 16, and with the ends of the rack bar 18 connected to the dirigible wheels of the vehicle by the tie rods 20A, 20B, force reactions encountered in normal operation of the motor vehicle may induce movement of the rack bar relative to the cylinder tube, e.g., flexure of the rack bar in beam bending relative to the cylinder tube. Because of the close fit of the bulkhead 42 on the rack bar 18 through the sleeve bearing 58, the movement of the rack bar is transferred through the sleeve bearing to the bulkhead which, consequently, also moves relative to the cylinder tube. Importantly, in such circumstance, the clearance 92 in the coupling 80 between the bulkhead 42 and the seal ring 60 and/or the flexibility of the flexible lip 88 of the coupling results in an uncoupling of the seal ring from the bulkhead with respect to such relative movement. Consequently, there is no relative movement between the cylinder tube 30 and the cylindrical outer surface 72 of the elastomeric body of the seal ring and no wear of the seal ring which would otherwise occur if the seal ring were rigidly attached to the bulkhead and moveable as a unit therewith relative to the cylinder tube.

We claim:

1. In a fluid motor in a rack and pinion motor vehicle steering gear including a rack bar and a cylinder tube around said rack bar, the combination comprising:

an annular bulkhead around said rack bar in an outboard end of said cylinder tube having an annular end facing a working chamber of said fluid motor, a bearing means between said bulkhead and said rack bar, a retaining means operative to prevent dislodgment of said bulkhead from said outboard end of said cylinder tube by fluid pressure in said working chamber of said fluid motor, a seal ring in said working chamber of said fluid motor adjacent said annular end of said bulkhead including an elastomeric body having a cylindrical outer surface compressed against said cylinder tube and an inner lip compressed against said rack bar, a coupling means operative to couple said seal ring to said bulkhead for unitary handling and transport outside of said cylinder tube and to uncouple said seal ring from said bulkhead within said cylinder tube to isolate said seal ring from relative movement between said bulkhead and said cylinder tube induced by movement of said rack bar relative to said cylinder tube transferred to said bulkhead through said bearing means thereby to prevent wear of said seal ring attributable to relative movement between said bulkhead and said cylinder tube, wherein said seal ring comprises a metal reinforcement having a cylindrical segment and an annular segment in a plane perpendicular to said cylindrical segment, an elastomeric body molded around said metal reinforcement with said cylindrical outer surface of said seal ring and said inner lip each integral with said elastomeric body concentric with said cylindrical segment of said metal reinforcement, and an annular polymeric insert on said elastomeric body between said inner lip and said bulkhead reinforcing said inner lip against being squeezed by fluid pressure in said working chamber of said fluid motor between said bulkhead and said rack bar, and a cylindrical shoulder on said bulkhead perpendicular to said annular end of said bulkhead, an annular lobe on said elastomeric body of said seal ring outboard of and longitudinally overlapping said cylindrical shoulder on said bulkhead, an annular groove in said cylindrical shoulder facing said annular lobe on said elastomeric body of said seal ring, and a flexible annular lip on said lobe on said elastomeric body of said seal ring stretched over said cylindrical shoulder on said bulkhead and seated in said annular groove in said cylindrical shoulder with predetermined clearance between said flexible annular lip and said annular groove so that said seal ring is loosely coupled to said bulkhead for unitary handling and transport.

2. The outboard seal recited in claim 1 wherein said retaining means operative to prevent dislodgment of said bulkhead from said outboard end of said cylinder tube by fluid pressure in said working chamber of said fluid motor comprises:

an annular groove in said bulkhead facing said cylinder tube, an annular groove in said cylinder tube facing said annular groove in said bulkhead, and a retaining ring radially overlapping each of said annular groove in said bulkhead and said annular groove in said cylinder tube.

\* \* \* \* \*